Patented Feb. 14, 1939

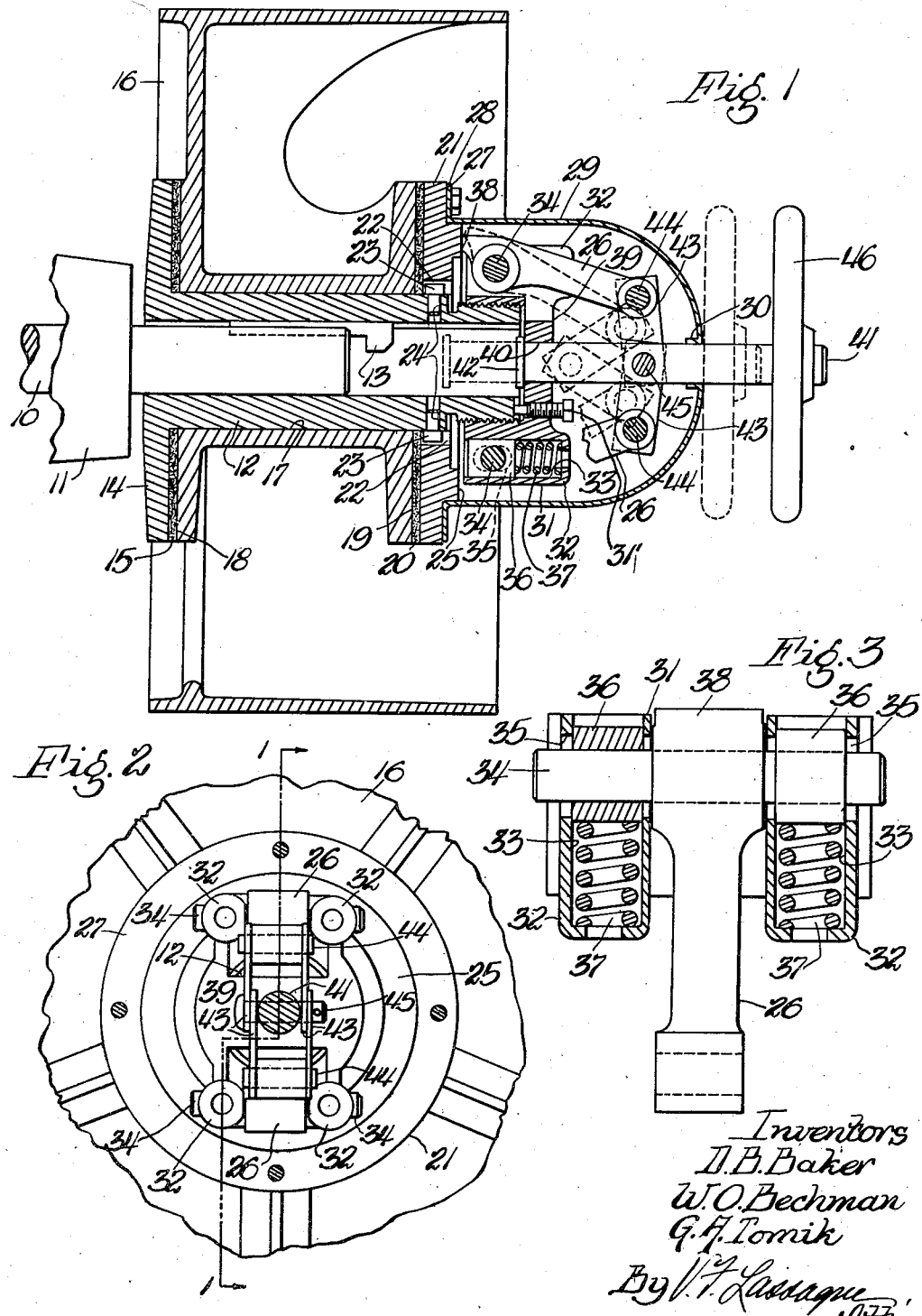

2,146,880

UNITED STATES PATENT OFFICE 2,146,880

FRICTION CLUTCH PULLEY

David B. Baker, Riverside, and William O. Bechman and George A. Tomik, Chicago, Ill., assignors to International Harvester Company, a corporation of New Jersey Application June 8, 1936, Serial No. 84,100

7 Claims. (Cl. 192—68)

This invention relates to a friction clutch device. More specifically, it relates to a friction clutch of the over-center type, particularly adapted for connecting a pulley to a shaft.

In the design of friction clutches the type known as the over-center type has been widely used, in which a linkage is moved past dead center during application of pressure to the friction faces, whereby springs or other mechanisms are not required to hold the faces in engagement. Clutches of this type are by nature of their construction very susceptible to wear, requiring frequent adjustment, if they are kept in desired range of constant pressure.

The principal object of the present invention is to provide a resilient mounting for the actuating mechanism of an over-center clutch, whereby the resilient pressure automatically takes care of a predetermined range of wear or misalignment.

More specific objects, such as the novel construction of the resilient mounting, will be apparent from the detailed description to follow.

In the drawing:

Figure 1 is a vertical section taken substantially on the center line of a friction clutch pulley embodying the invention. The center portion, which is not a true vertical section, may be considered as being taken on the line 1—1 of Figure 2;

Figure 2 is an end elevation of the clutch construction shown in Figure 1 with the hand wheel and cover removed better to show the actuating mechanism; and, Figure 3 is an enlarged sectional view of one of the clutch actuating levers and the resilient support therefor.

In Figure 1, a shaft 10 is shown extending from a support 11 in which it is journaled. The shaft may be an engine drive shaft or any other power shaft. A sleeve 12 is rigidly secured on the shaft 10 by a key 13. Said sleeve is provided with a radially extending flange 14 to which a friction clutch facing 15 is secured by any conventional means which have been illustrated. A pulley 16 is provided with an internal bore 17, which is rotatably mounted on the outer cylinder surface of the sleeve 12.

Said pulley is formed at one end with a flat face 18 adapted to frictionally engage the facing 15 upon the application of pressure in an axial direction. The pulley 16 is also provided at its other end with a flat face 19 adapted to frictionally engage a clutch facing 20 carried by a clutch member 21. Said member is mounted against rotation and for movement in an axial direction on the sleeve 12 which extends in an axial direction a substantial distance beyond the clutch facing 20. The means by which said clutch means is mounted on the sleeve consists of diametrically spaced slots 22 extending outwardly from the inside diameter and a pair of headed studs 23, which are fitted into bores 24 formed in the sleeve 12. The member 21 is of a sufficient thickness in an axial direction to permit movement sufficient to be held against rotation by the studs 23 during the normal wear of the clutch facings 15 and 20.

The clutch member 21 is formed with an annular contact face 25 which is engaged by actuating levers 26. Adjacent the face 25 an annular recess 27 is provided which forms a seat for a radial flange 28 of a pressed metal housing 29. Said housing is substantially hemispherical and is provided with an opening concentric with the drive shaft 10 formed by means of an in-turned flange 30.

The sleeve 12 extends axially beyond the clutch member 21, being reduced in size and threaded. A member 31 which carries the actuating levers 26, as will be described in detail, is adjustably threaded onto the threaded end of the sleeve 12. A set screw 31' threaded through the member 31 engages a notch formed in the end of the sleeve 12 to hold the member in adjusted position. Said member, in addition to a threaded annular portion, is provided with spaced pairs of spring housings 32. Said housings are formed with cylindrical bores 33, the axes of which are parallel with the axis of the drive shaft 10. Each pair of housings 32 is spaced to provide therebetween a mounting for one of the actuating levers 26. A pivot pin 34 extends through the actuating lever 26 through aligned slots 35 in the spring housings and through pivot blocks 36 mounted for reciprocation in the spring housings. Said blocks are cylindrical and operate as pistons in the housings. Springs 37 abut the inner ends of the blocks 36 and the inside end walls of the housings, thereby resiliently urging the blocks in a direction toward the clutch member. The slots 35 are of a length sufficient to allow the desired resiliency obtained by compression of the springs 37. As the actuating levers 26 are mounted exactly centered between the spaced housings 32, pressure on the springs is so nearly equally divided as to not tend to effect twisting about their axes. Moreover, the pivot blocks 36 are of sufficient length to form guides in the bores 33.

The actuating lever 26 is shaped with an engaging nose or contact portion 38, which is shaped to best perform the function of exerting pressure against the face 25 of the clutch member. The engaging portion is formed as a cam surface of the proper contour to apply the leverage obtained by the large ratio obtained by the construction of the actuating lever. It will be understood that pressure applied by the levers 26 against the clutch member 21 applies pressure to each of the friction faces 15, and 20, thereby operatively engaging the faces. If the linkage has been adjusted to obtain movement greater than that permitted by exerting pressure on the facing material, the device is still operative due to the resilient mounting of the pivot pins 34. When pressure has reached that amount necessary to compress the springs 37, the pivot pins 34 move to the right, referring to Figure 1, thereby compressing the springs 37. This construction automatically takes care of wear within the limits provided for in the linkage. It is to be understood that the pressure necessary to compress the springs 37 is somewhat above the pressure necessary to operatively engage the clutch facings for the torque to be transmitted.

The support 31 is formed on its outer end with a transverse web 39 formed with a central bore 40 concentric with the drive shaft 10. An actuating shaft 41 slidably fitted in the bore 40 is provided with a head 42 within the web. It will be noted that the power shaft 10 terminates within the sleeve 12 to leave a space in which the actuating shaft 41 may be operated as indicated by the dotted lines in Figure 1. Spaced pairs of links 43 are connected by pivot pins 44 with the actuating levers 26. Said links are also connected by a pivot pin 45 with the actuating shaft 41. Said pins may be secured in position by any conventional means. The length of said links and the locations of the pivot pins are such as to form an over-center lock, as best illustrated in Figure 1. It will be noted that the center of the pin 45 is to the right of a center line connecting the centers of the pins 44. This forms an over-center lock. In this position the head 42 of the actuating shaft 41 abuts the inner side of the web 39. A hand wheel 46 is illustrated rigidly connected to the actuating shaft 41. Said wheel rotates with the shafts, but is of a smoooth construction whereby it may be grasped by the hands for engaging and disengaging the clutch.

The operation of the clutch as above described has been explained in connection with the description. The dotted line position of the actuating levers 26 and of the hand wheel 46 with the shaft 41 show the positions of the parts in disengaged position.

It is to be understood that applicants have shown and described only a preferred embodiment of an improved over-center clutch and that they claim as their invention all modifications falling within the scope of the appended claims.

What is claimed is:

1. In a clutch assembly having an annular clutch member mounted for axially slidable movement, an actuating member support mounted non-rotatably with respect to the clutch member, said support and the clutch member being relatively movable axially, said support being formed with diametrically located spaced pairs of bores extending inwardly from the clutch member and pivot blocks mounted for reciprocation in said bores, springs mounted in said bores and abutting against said blocks resiliently urging the blocks in a direction toward the clutch member, slots formed in the support adjacent the pivot blocks, pivot pins extending through the respective pairs of pivot blocks, actuating levers pivoted on said pins, said levers being formed with cam faces engageable with the clutch member, and means for operating said levers.

2. In a clutch assembly having an annular clutch member mounted for axially slidable movement, an actuating member support mounted non-rotatably with respect to the clutch member, said support and the clutch member being relatively movable axially, said support being formed with diametrically located spaced pairs of bores extending inwardly from the clutch member and pivot blocks mounted for reciprocation in said bores, springs mounted in said bores and abutting against said blocks resiliently urging the blocks in a direction toward the clutch member, slots formed in the support adjacent the pivot blocks, pivot pins extending through the respective pairs of pivot blocks, actuating levers pivoted on said pins, said levers being formed with cam faces engageable with the clutch member, a control shaft mounted for reciprocation in the actuating member support, and oppositely spaced pairs of links pivoted to said shaft and to the actuating levers, said links being of a size and being positioned to provide an over-center lock when the shaft is moved to its extreme outward position with the clutch member in engagement and said links being constructed to release pressure against the clutch member when the control shaft is moved inwardly.

3. A device as set forth in claim 2, in which a housing is fitted over the actuating levers and the support therefor, said housing being secured to the clutch member and being formed with an opening in line with the axis of the actuating shaft through which said shaft extends.

4. A clutch assembly comprising, in combination with a shaft, a sleeve rigidly mounted on said shaft, said sleeve being provided with a radial flange at one end, a pulley rotatably mounted on said sleeve, said pulley being formed with a clutch face adjacent the radial flange, friction material positioned between said face and said flange, an annular clutch member mounted on said sleeve against rotation with respect thereto and for axially slidable movement with respect thereto, a clutch face formed on the pulley adjacent said clutch member, friction material positioned between said face and said member, said sleeve extending axially beyond the clutch member, an actuating member support rigidly mounted on the sleeve extension, said support being formed with diametrically located spaced pairs of bores extending inwardly from the clutch member, pivot blocks mounted for reciprocation in said bores, and springs mounted in said bores and abutting against said blocks resiliently urging the blocks in a direction toward the clutch member, slots formed in the support adjacent the pivot blocks, pivot pins extending through the respective pairs of pivot blocks, actuating levers pivoted on said pins, said levers being formed with cam faces engageable with the clutch member, and means for operating said levers.

5. An over-center clutch assembly comprising, in combination with a shaft, a sleeve rigidly mounted on said shaft, said sleeve being provided with a radial flange at one end, a pulley rotatably mounted on said sleeve, said pulley being formed with a clutch face adjacent the radial flange, friction material positioned between said face and said flange, an annular clutch member mounted on said sleeve against rotation with respect thereto and for axially slidable movement with respect thereto, a clutch face formed on the pulley adjacent said clutch member, friction material positioned between said face and said member, said sleeve extending axially beyond the clutch member, an actuating member support rigidly mounted on the sleeve extension, said support being formed with diametrically located spaced pairs of bores extending inwardly from the clutch member, pivot blocks mounted for reciprocation in said bores, springs mounted in said bores and abutting against said blocks resiliently urging the blocks in a direction toward the clutch member, slots formed in the support adjacent the pivot blocks, pivot pins extending through the respective pairs of pivot blocks, actuating levers pivoted on said pins, said levers being formed with cam faces engageable with the clutch member, a control shaft mounted for reciprocation in the actuating member support, and oppositely spaced pairs of links pivoted to said shaft and to the actuating levers, said links being of a size and being positioned to provide an over-center lock when the shaft is moved to its extreme outward position with the clutch member in engagement and said links being constructed to release pressure against the clutch member when the control shaft is moved inwardly.

6. A device as set forth in claim 5, in which a housing is fitted over the actuating levers and the support therefor, said housing being secured to the clutch member and being formed with an opening in line with the axis of the actuating shaft through which said shaft extends.

7. In a clutch assembly having an annular clutch member mounted for axially slidable movement, an actuating member support mounted non-rotatably with respect to the clutch member, said clutch member and said support being relatively movable axially, a plurality of pivot blocks mounted on said support for movement away from the clutch member upon the application of pressure thereto, an actuating lever pivotally mounted on each block, said levers being formed with cam faces engageable with the clutch member, individual resilient means interposed between each pivot block and the support substantially in the vicinity of the pivotal mountings of the actuating levers, a control member mounted for reciprocation coaxially with the clutch member, and links pivotally connected to the control member and to the actuating levers, said links being positioned and formed to provide an over-center lock when the control member is moved to its extreme position with the clutch member resiliently urged into engaged position.

DAVID B. BAKER.
WILLIAM O. BECHMAN.
GEORGE A. TOMIK.